(12) United States Patent
Stall et al.

(10) Patent No.: US 8,793,671 B2
(45) Date of Patent: Jul. 29, 2014

(54) INTERFACE OPTIMIZATION IN A CLOSED SYSTEM

(75) Inventors: Jeffrey E. Stall, Kirkland, WA (US); Jonathon Michael Stall, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1321 days.

(21) Appl. No.: 12/164,029

(22) Filed: Jun. 28, 2008

(65) Prior Publication Data

US 2009/0328020 A1 Dec. 31, 2009

(51) Int. Cl.
*G06F 9/45* (2006.01)

(52) U.S. Cl.
CPC ........................... *G06F 8/443* (2013.01)
USPC ........................................................ 717/151

(58) Field of Classification Search
CPC .............................. G06F 8/443; G06F 8/4441
USPC .................................................. 717/140–161
See application file for complete search history.

(56) References Cited

U.S. PATENT DOCUMENTS

| | | | |
|---|---|---|---|
| 6,163,880 A | 12/2000 | Ramalingam et al. | |
| 6,260,045 B1 | 7/2001 | Eidt | |
| 6,393,491 B1 | 5/2002 | Bracha et al. | |
| 6,643,711 B2* | 11/2003 | Bracha et al. | 719/315 |
| 6,651,248 B1 | 11/2003 | Alpern | |
| 6,862,728 B2 | 3/2005 | Darnell et al. | |
| 6,941,550 B1 | 9/2005 | Sollich | |
| 7,430,734 B2* | 9/2008 | Sollich | 717/166 |
| 7,478,409 B2* | 1/2009 | Scian et al. | 719/328 |
| 2001/0020243 A1* | 9/2001 | Koppolu et al. | 707/513 |
| 2002/0107996 A1* | 8/2002 | Bracha et al. | 709/315 |
| 2002/0108107 A1* | 8/2002 | Darnell et al. | 717/153 |
| 2005/0132007 A1* | 6/2005 | Scian et al. | 709/206 |
| 2005/0172301 A1* | 8/2005 | Sollich | 719/315 |
| 2009/0138847 A1* | 5/2009 | Beckwith et al. | 717/108 |

OTHER PUBLICATIONS

Amiel et al., "Fast algorithms for compressed multi-method dispatch tables generation," Sep. 1996, INRIA, p. 1-63.*
Alpern et al., "Efficient Implementation of Java Interfaces: Invokeinterface Considered Harmless," 2001, ACM, p. 108-124.*
Kidd, Eric, "Efficient Compression of Generic Function Dispatch Tables," Jun. 2001, Dartmouth College, p. 1-22.*
Vitek, et al., "Compact Dispatch Tables for Dynamically Typed Object Oriented Languages", 1996, 17 pages.
Krall, et al. "CACAO—A 64 Bit JavaVM Just-in-Time Compiler", 1997, 10 pages.

(Continued)

*Primary Examiner* — Qing Chen
(74) *Attorney, Agent, or Firm* — Micah Goldsmith; Glen Johnson; Micky Minhas

(57) ABSTRACT

Interface optimization is provided using a closed system in which all the individual software components in the system are known to the compiler at a single point in time. This knowledge enables significant opportunities to optimize the implementation of interfaces on a set of implemented objects. When code is compiled, because the compiler knows the full list of interfaces and the objects which implement the interfaces, it can improve execution and working set (i.e., recently referenced pages in a program's virtual address space) when implementing the interfaces on objects. This improvement may be realized by reducing the size of interface lookup tables which map each interface to the object types which implement that particular interface.

20 Claims, 3 Drawing Sheets

(56) References Cited

OTHER PUBLICATIONS

Pang, et al., "Multi-Method Dispatch using Multiple Row Displacement Existing Multi-Method Dispatch Techniques", Technical Report TR 98-12, Nov. 1998, pp. 1017-1030.

Dujardin, et al., "Fast Algorithms for Compressed Multi-Method Dispatch Tables Generation", 1998, p. 116-165.

Driesen, "Selector Table Indexing & Sparse Arrays", 1993, p. 259-270.

* cited by examiner

|   | I1 | I2 | I3 | I4 | I5 |
|---|----|----|----|----|----|
| A | a1 | a2 |    |    |    |
| B |    |    | b3 | b4 |    |
| C | c1 | c2 |    |    |    |
| D |    | d2 | d3 |    |    |
| E | e1 |    |    |    |    |
| F |    |    |    |    | f5 |

| I1 | I2 | I3 | I4 |
|----|----|----|----|
| a1 | a2 | b1 | b2 |
| c1 | c2 |    |    |
| e1 | d2 | d3 | e4 |

INTERFACE OPTIMIZATION IN A CLOSED SYSTEM

BACKGROUND

A traditional "open system", such as the .NET runtime environment supported by Microsoft Corporation, describes a situation where individual components such as DLLs (dynamically linked libraries) may be compiled at any time, and loaded into a common process at any time. For example, an "interface" declared in "A.dll" may be implemented or consumed by another component in "B.dll", that was unknown at the time that "A.dll" was compiled. Accommodating this situation typically requires that any compile-time implementation or runtime data-structures be flexible enough to allow for an interface to be implemented or consumed by anyone in the future, even if the situation actually never occurs in a given program when executed. Accordingly, providing for such flexibility can often incur a high performance cost when implementing and then calling interfaces in a program.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Interface optimization is provided using a closed system in which all the individual software components in the system are known to the compiler at a single point in time. This knowledge enables significant opportunities to optimize the implementation of interfaces on a set of implemented objects. When code is compiled, because the compiler knows the full list of interfaces and the objects which implement the interfaces, it can improve execution and working set (i.e., recently referenced pages in a program's virtual address space) when implementing the interfaces on objects. This improvement may be realized by reducing the size of interface lookup tables which map each interface to the object types which implement the particular interface.

In various illustrative examples, a set of five optimizations are applied to the interface lookup table including i) grouping object types that actually implement interfaces at the beginning of the interface lookup table; ii) progressively collapsing singularly-implemented interfaces; iii) applying statistical compression of the interface lookup table based on usage patterns of the object types throughout a program; iv) constant-folding for interface-to-instance lookup; and v) progressively collapsing never-called members and interfaces to remove unused members of the interface. The optimizations may be repeatedly applied until no further transformations of the interface lookup table occur.

Advantageously, the present interface optimizations enable software developers to use interface constructs without incurring the usual overhead that is associated with a managed development environment such as .NET or Java. The optimized program code will typically execute faster and consume significantly fewer resources at runtime. For example, these optimizations can reduce the overhead of interface lookup tables from 2500 KB to 45 KB for a typical program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 3 shows an illustrative interface lookup table that maps each interface to the object type that implements that interface;

FIG. 4 shows an illustrative compressed interface lookup table; and

Like reference numerals indicate like elements in the drawings.

DETAILED DESCRIPTION

Figure 1:
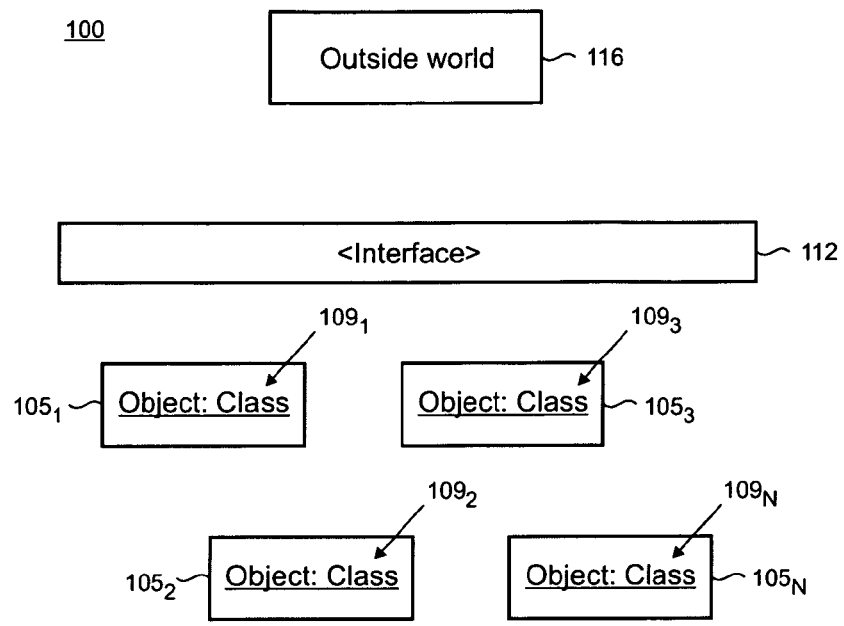
FIG. 1 shows an illustrative set of object-oriented programming constructs including objects, classes, and interfaces.

FIG. 1 shows an illustrative set 100 of object-oriented programming constructs including objects, classes, and interfaces that define the fundamental terminology that is used through the description of the present interface optimization in a closed system. Set 100 includes a plurality of objects $105_{1, 2 \ldots N}$. The objects 105 have some state and expose various methods or functions as may be required to implement some desired programming goal or functionality. The objects 105 will typically be instances of one or more classes $109_{1, 2 \ldots N}$ which provide a blueprint from which the individual objects 105 are created.

Interaction with the methods exposed by the objects 105 is implemented using one or more interfaces (representatively illustrated by interface 112). The interface 112 essentially is composed of members which can include any of the following: i) methods; ii) properties; iii) constructors; iv) events; and, v) fields. Accordingly, the interface 112 forms a contract for supporting some functionality to the "outside world" (as indicated by reference numeral 116) which is enforced at build time by a compiler. Typically, if a class 109 implements an interface, then it must provide the implementation details for all members defined by the interface. In a traditional open system, an interface may be implemented or consumed by a component at any time, for example, even after the compilation of the component that declared the interface originally.

Figure 2:
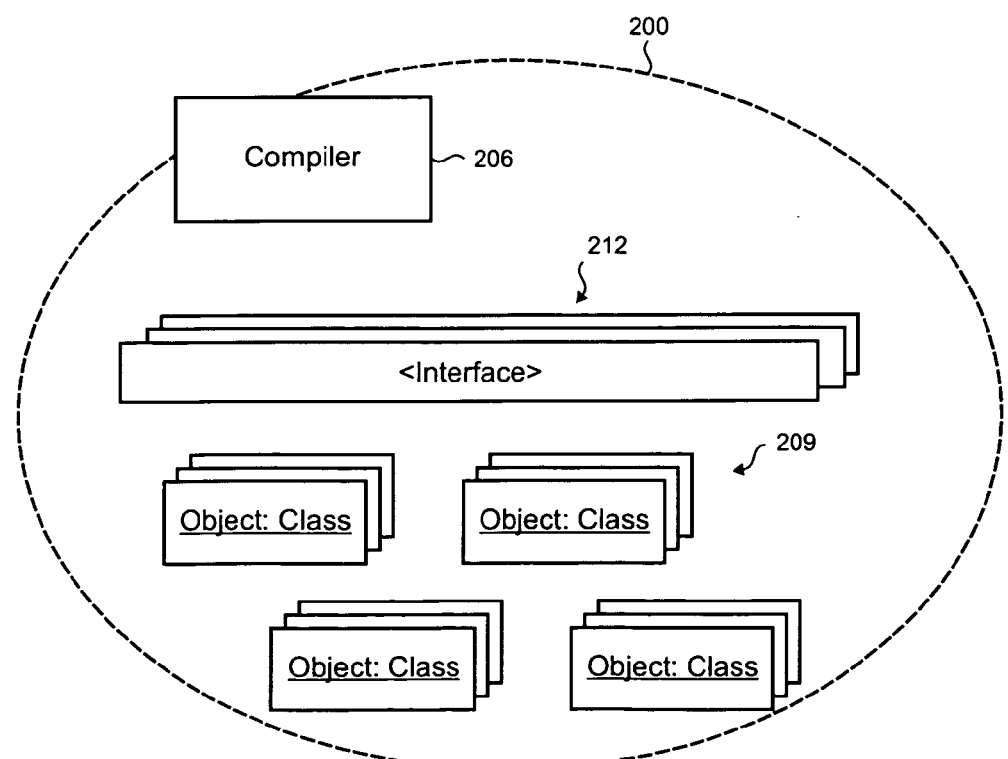
FIG. 2 shows an illustrative closed runtime environment in which a compiler has awareness of all interfaces and objects that implement interfaces at a single point in time.

FIG. 2 shows an illustrative closed runtime environment 200. In comparison to the traditional open system, a compiler 206 here has awareness of all interfaces (collectively identified by reference numeral 212) and classes (collectively identified by reference numeral 209) that implement interfaces at a single point in time.

In the closed runtime environment 200, consider a set of declarations for Classes (A . . . F) that implement interfaces (I1 . . . I5):

```
class A : I1, I2
class B : I3, I4
class C : I1, I2
class D : I2, I3
class E : I1, I4
class F : I5
```

A set of auxiliary lookup tables (termed "interface lookup tables" here) can be built that maps each interface to the object types that implement that particular interface. In the interface lookup tables, each class 209 is assigned a unique index represented by a single row in the interface lookup table. Each interface 212 is assigned a unique index which is represented by a single column in the built up table.

An illustrative interface lookup table 300 is shown in FIG. 3. Each element in the table 300 refers to the function's v-table (i.e., the "virtual table" that acts as an array of pointers to functions) for the given interface. For example, 'a2' is class A's v-table for interface I2, 'b3' is class B's v-table for interface I3, and so on.

A typical application could have 4,000 non-interface object types across 150 interfaces. For a naive implementation, this would result in an interface lookup table that would be approximately 2400 KB in size on a 32 bit system (i.e., 4,000 types*150 interfaces*4 bytes).

When code invokes this interface, for example

```
I1 p1 = ...
p1→Foo( )
``` then the v-table would naively be retrieved as

Table(Idx__1, p1→GetIface( ))

where the GetIface ( ) function is a function to return the object's row index into the interface lookup table.

Because the runtime environment is closed, as described in the text accompanying FIG. 2, and all the classes and interfaces are known at compile time, five different optimizations by the compiler may be applied to the interface lookup table 300. Each optimization may be applied repeatedly until no further transformations to the table 300 occur.

The optimizations make use of the observation that many interfaces in managed environments are generic and are intended to be utilized by a wide variety of different applications. Most programs only use a subset of the members of an interface, and rarely are all of the members utilized. Since programs tend to use different members, a given interface may have a lot of members. But while interfaces are broadly defined to provide general applicability, by making use of the closed system, not all the members in the interface need to be retained when a specific program is compiled. After the optimizations are performed, the optimized code produced by the compiler will typically enable the program to be smaller and run in the most efficient implementation for a given device, while consuming measurably fewer resources (e.g., memory and computational cycles) given that interface calls tend to be expensive. Such performance enhancements can be particularly beneficial on devices that are resource constrained like handheld electronic devices or other "thin" clients.

The first optimization comprises grouping object types that implement interfaces at the beginning of the interface lookup table. Here, classes such as "System.Object", the base class for all objects in the .NET framework, would be assigned a "type index" at the beginning of the interface lookup table 300. Instead, it can be assigned an index following all classes across all modules that implement interfaces. In an open system such optimization would normally not be possible since modules loaded later in the compilation process would have their type indices appended at the end of all lists.

The second optimization comprises progressively collapsing singularly-implemented interfaces. In this case, the compiler 206 will search for interfaces that only implement one class. In the interface lookup table 300, for example, interface I5 only implements class F. Accordingly, all instances of interface I5 must actually be an instance of the class F, and thus the corresponding row and column can be completely removed from the interface lookup table 300. This has the effect of shrinking the table size.

Calls to the interface can be translated, for example, from

```
// Make an interface call
I5 p5 = ... ;
p5->Foo ( );
``` to

```
// Now a non-interface call to the de-referenced method
F p5 = (F) ... ;
p5→I5_Foo ( );
``` as interface calls are normally expensive.

The third optimization comprises the application of statistical compression of the interface lookup table 300 based on usage patterns through a program. In this case, the interface lookup table 300 can be compressed so long as it is guaranteed that reverse mapping can be performed from interface type and object type to the object v-table for a given interface. An illustrative compressed interface lookup table 400 is shown in FIG. 4.

The compiler 206 can perform compression on the original interface lookup table 300 at compile time because the table inputs are known in the closed system. The compiler 206 can apply an arbitrarily aggressive packing algorithm at compile time to get the desired compaction efficiency.

In this example, the original interface lookup table 300 was compressed from a 5×6 table (30 cells) to 4×3 (12 cells) which represents a 60% reduction in size.

The fourth optimization comprises constant-folding for interface-to-instance lookup. The implementations of the Table( ) and GetIface( ) methods may be utilized here to replace variable lookups with compile-time constants. This optimization enables faster dereferencing of an interface on a given object instance.

The fifth optimization comprises progressively collapsing never-called members and interfaces. In this optimization, dead code across interfaces can be detected by the compiler 206 and removed at compile time. Interface members that are never called can also be removed. In addition, interfaces that become empty or are never called can be completely removed. This result becomes very valuable when implementing large "Base Class Libraries" in managed runtime environments where an interface may expose a significant amount of unneeded functionality. For example, if "ICollection.SyncRoot" is never called by the application, this member may be completely removed from the interface. An interface may be removed from a single type if it is provable that the code never accesses that interface on that type. And, an interface may be removed completely if it is never used in the program.

Figure 5:
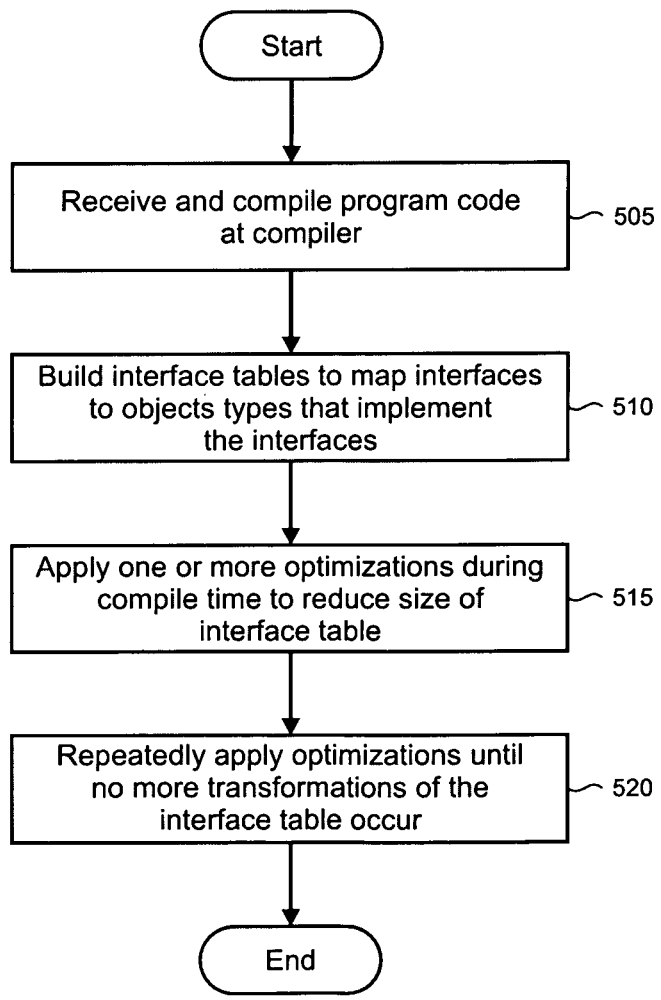
FIG. 5 shows a flowchart for an illustrative method for performing interface optimization in a closed system.

FIG. 5 shows a flowchart for an illustrative method 500 for performing interface optimization in a closed system. Program code is received and compiled by the compiler 206 (505). A set of auxiliary lookup tables (i.e., interface lookup tables) are built that map each interface used in the program to the object types that implement the interfaces (510). One or more of the five optimizations discussed above can then be applied to reduce the size of the table (515). The optimizations may be repeatedly applied until no more transformations of the interface lookup table occur (520).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a compiler at compile time of program code, for optimizing interfaces, the method comprising the steps of:

receiving and compiling the program code by the compiler;

building an interface lookup table that maps each interface in the program code to object types that implement each interface, the compiler having knowledge of all the interfaces and the object types implementing the interfaces at compile time of the program code, the compiler performing the method in a closed system in which source code is directly compiled into executable machine code without generation of intermediate code, the closed system not utilizing a common language runtime environment nor a Java runtime environment when the machine code is executed at runtime;

applying one or more optimizations at compile time of the program code to the interface lookup table that are arranged to reduce the interface lookup table's size; and iteratively reapplying the one or more optimizations at compile time of the program code to the interface lookup table until no additional transformations to the interface lookup table occur.

2. The method of claim 1 in which the one or more optimizations include an optimization that groups object types from the program code that implement interfaces at the beginning of the interface lookup table.

3. The method of claim 1 in which the one or more optimizations include an optimization that progressively collapses singularly-implemented interfaces.

4. The method of claim 1 in which the one or more optimizations include an optimization that applies statistical compression of the interface lookup table based on usage patterns throughout the program code.

5. The method of claim 1 in which the one or more optimizations include an optimization that performs constant-folding for interface-to-instance lookup.

6. The method of claim 5 in which implementations of Table( ) and GetIface( ) are utilized to replace variable lookups with compile-time constants so as to enable faster dereferencing of an interface on a given object instance.

7. The method of claim 1 in which the one or more optimizations include an optimization that progressively collapses never-called members and never-called interfaces to remove dead program code across interfaces.

8. A method, performed by a compiler at compile time of program code, for optimizing interfaces by removing dead program code, the method comprising the steps of:

receiving and compiling the program code by the compiler;

arranging the compiler to operate in a closed system in which the compiler has knowledge of all interfaces and object types implementing the interfaces at compile time of the program code, source code being directly compiled into executable machine code in the closed system without generation of intermediate code, the closed system not utilizing either a common language runtime environment or a Java runtime environment when the machine code is executed at runtime;

building an interface lookup table that maps each interface in the program code to the object types that implement each interface;

removing a member from an interface that is never called by the program code;

removing an interface that has become empty; and removing an interface that is never called.

9. The method of claim 8 including the further step of iteratively applying one or more optimizations at compile time of the program code to the interface lookup table that are arranged to reduce the interface lookup table's size until no additional transformations to the interface lookup table occur.

10. The method of claim 9 in which the one or more optimizations include an optimization that groups object types from the program code that implement interfaces at the beginning of the interface lookup table.

11. The method of claim 9 in which the one or more optimizations include an optimization that progressively collapses singularly-implemented interfaces.

12. The method of claim 9 in which the one or more optimizations include an optimization that applies statistical compression of the interface lookup table based on usage patterns throughout the program code.

13. The method of claim 12 in which the statistical compression includes application of a packing algorithm at compile time.

14. The method of claim 9 in which the one or more optimizations include an optimization that performs constant-folding for interface-to-instance lookup.

15. A method, performed by a compiler at compile time of program code, for optimizing interfaces, the method comprising the steps of:

receiving and compiling the program code by the compiler;

building an interface lookup table that maps each interface in the program code to object types that implement each interface, the compiler having knowledge of all the interfaces and the object types implementing the interfaces at compile time of the program code, the compiler performing the method in a closed system in which source code is directly compiled into executable machine code without generation of intermediate code, the closed system not utilizing a common language runtime environment nor a Java runtime environment when the machine code is executed at runtime;

grouping object types from the program code that implement interfaces at the beginning of the interface lookup table; and assigning a base class for all objects with a type index for appending at the interface lookup table's end.

16. The method of claim 15 in which the interface lookup table is configured so that each class is assigned a unique index that is represented by a single row within the interface lookup table.

17. The method of claim 16 in which each interface is assigned a unique index that is represented by a single column in the interface lookup table.

18. The method of claim 17 in which each element in the interface lookup table refers to a function's v-table for an interface.

19. The method of claim 18 including a further step of naively retrieving the function's v-table when the program code invokes the interface.

20. The method of claim 19 including a further step of iteratively applying optimizations at compile time of the program code to the interface lookup table to reduce the interface lookup table's size until no additional transformations to the interface lookup table occur.

* * * * *